(12) United States Patent
Pouyllau et al.

(10) Patent No.: US 11,195,110 B2
(45) Date of Patent: Dec. 7, 2021

(54) METHOD OF EXPLAINING A SCORE

(71) Applicant: THALES, Courbevoie (FR)

(72) Inventors: Helia Pouyllau, Palaiseau (FR);
Christophe Labreuche, Palaiseau (FR);
Benedicte Goujon, Palaiseau (FR)

(73) Assignee: THALES, Courbevoie (FR)

( * ) Notice: Subject to any disclaimer, the term of this patent is extended or adjusted under 35 U.S.C. 154(b) by 993 days.

(21) Appl. No.: 15/561,229

(22) PCT Filed: Mar. 25, 2016

(86) PCT No.: PCT/EP2016/056738
§ 371 (c)(1),
(2) Date: Oct. 3, 2017

(87) PCT Pub. No.: WO2016/151145
PCT Pub. Date: Sep. 29, 2016

(65) Prior Publication Data
US 2018/0060746 A1 Mar. 1, 2018

(30) Foreign Application Priority Data

Mar. 26, 2015 (FR) ..................................... 15/00602

(51) Int. Cl.
*G06N 5/04* (2006.01)
*G06N 7/00* (2006.01)
(Continued)

(52) U.S. Cl.
CPC ............. *G06N 5/045* (2013.01); *G06F 17/11* (2013.01); *G06N 7/005* (2013.01); *G06Q 40/025* (2013.01)

(58) Field of Classification Search
CPC ......... G06N 5/045; G06N 7/005; G06F 17/11
See application file for complete search history.

(56) References Cited

U.S. PATENT DOCUMENTS

2006/0047613 A1   3/2006  Labreuche
2015/0142717 A1*  5/2015  Guiver ................. G06Q 10/107
                                                706/46
(Continued)

FOREIGN PATENT DOCUMENTS

FR     2 848 006 A1    6/2004

OTHER PUBLICATIONS

O'Brien, Geaórid, Abbas El Gamal, and Ram Rajagopal. "Shapley value estimation for compensation of participants in demand response programs." IEEE Transactions on Smart Grid 6.6 (2015): 2837-2844. (Year: 2015).*

(Continued)

*Primary Examiner* — Hal Schnee
(74) *Attorney, Agent, or Firm* — Nixon & Vanderhye

(57) ABSTRACT

A score explanation method for explaining a score includes at least steps of: a1) providing a first score associated with a first vector containing the first values of the parameters; b) generating a first set of lists, each list including a second number of indicators; c) generating, from a list, of at least a third vector wherein each parameter has a third value; the third value being equal to the corresponding first value when the list does not include an indicator of the corresponding parameter, and different from the corresponding first value otherwise; d) calculating the score of at least one third vector; e) evaluating, from the scores calculated for each of the third vectors, an indicator of significance of each parameter; f) elaborating, from the evaluated indicators of significance, an explanation of the first score.

16 Claims, 4 Drawing Sheets

(51) Int. Cl.
*G06Q 40/02* (2012.01)
*G06F 17/11* (2006.01)

(56) References Cited

U.S. PATENT DOCUMENTS

2015/0355374 A1* 12/2015 Morton ............... G01V 99/005
 703/10
2017/0046460 A1* 2/2017 Caplan .................... G06F 30/20

OTHER PUBLICATIONS

Mishra, Debasis, and Bharath Rangarajan. "Cost sharing in a job scheduling problem using the shapley value." Proceedings of the 6th ACM Conference on Electronic Commerce. 2005. (Year: 2005).*
Štrumbelj, Erik, and Igor Kononenko. "Explaining prediction models and individual predictions with feature contributions." Knowledge and information systems 41.3 (2014): 647-665. (Year: 2014).*
Art B. Owen: "Sobol' Indices and Shapley Value", SIAM/ASA Journal on Uncertainty Quantification, vol. 2, No. 1, Jan. 31, 2014 (Jan. 31, 2014), pp. 245-251, XP055247503, DOI: 10.1137/130936233.
Tomasz Pawel Michalak et al: "Efficient Computation of the Shapley Value for Game-Theoretic Network Centrality", Journal of Artificial Intelligence Research, Feb. 3, 2014 (Feb. 3, 2014), pp. 607-650, XP055247498, Retrieved from the Internet <URL:http://arxiv.org/ftp/arxiv/papers/1402/1402.0567.pdf> [retrieved on Feb. 4, 2016], DOI: 10.1613/jair.3806.
International Search Report, dated Jun. 30, 2016, from corresponding PCT/EP2016/056738 application.
FR Search Report, dated Feb. 5, 2016, from corresponding FR1 500 602 application.
Štrumbel and Kononenko, "An Efficient Explanation of Individual Classifications using Game Theory," Journal of Machine Learning Research, vol. 11, 2010, pp. 1-18.
Štrumbelj and Kononenko, "Explaining prediction models and individual predictions with feature contributions," Knowledge and Information Systems, vol. 41, 2014, pp. 647-665.

* cited by examiner

METHOD OF EXPLAINING A SCORE

FIELD OF THE INVENTION

The present invention relates to a method for explaining a score associated with a vector by a function. The invention also relates to an associated computer program product and to an information medium on which is encoded such a computer program product. The invention also relates to a system for explaining a score associated with a vector by a function.

BACKGROUND OF THE INVENTION

In many fields, systems for assisting with decision making are used for evaluating selections which are provided to decision makers. For example, a banker evaluates the capacity of paying back of a customer being based on information such as the monthly salary, the existence of previous loans or the capital brought by the customer. These data are grouped by the system for assisting with decision making, which calculates a score from these data. The banker then decides, depending on the score obtained by the customer, on either granting him/her or not a loan and if necessary at which rate.

The system assisting with decision making uses, for calculating the score, a mathematical model established from the knowledge of experts in the relevant field of application. Thus, such a system for assisting with decision making gives the possibility of rapidly making a decision which may be complex, notably in the case when each alternative comprises a great number of parameters. Indeed, instead of having to consider the whole of the parameters, some of which may be favorable and others unfavorable, the decision maker will only have to consider the calculated score. Further, such mathematical models are generally elaborated from the know how of several experts.

However, the mathematical model used may not be applied in the same way to all the situations and its complexity may make the global score not very understandable for the decision maker. This is all the more true if the number of relevant parameters is high. It may therefore be important for the decision maker to know which parameters have played the most significant role in the calculation of the score, in order to be able to accordingly adapt the decision made.

Therefore there exist methods giving the possibility of generating an explanation of a score. However, the application of such methods assumes a large number of calculations, and the time required for elaborating the explanation may be too high for certain fields of application. If the computing time is reduced, the method becomes less accurate.

Further, the generated explanation is not always relevant.

Further, such methods are generally related to the decision making assistance system used. The explanations are generated from the mathematical model used. It is therefore not easy to adapt the existing methods to systems using other mathematical models. Thus, the existing explanation methods assume the knowledge of the mathematical model with which it will be used.

SUMMARY OF THE INVENTION

There is therefore a need for an explanation method for explaining a score, that is obtained by using a function that is either known or not known, which presents better performance elements in particular in terms of relevance of the explanation.

To this end, the invention provides a score explanation method for explaining a score associated with a vector of a first number of parameters by means of a function, each parameter being ordered with an indicator varying from one to the first number, the first number being an integer that is strictly greater than one, the method including at least the following steps:

a1) providing a first score associated with a first vector containing first values of the parameters;

b) generating a first set of lists, each list comprising a second number of indicators, the second number being an integer that is strictly less than the first number and strictly greater than zero;

c) generating, from a list, of at least a third vector wherein each parameter has a third value;

the third value being equal to the corresponding first value when the list does not include an indicator of the corresponding parameter, and different from the corresponding first value in the opposite case;

d) calculating the score of at least one third vector;

e) evaluating, from the scores calculated for each of the third vectors, an indicator of significance of each parameter;

f) elaborating, from the evaluated indicators of significance, an explanation of the first score.

According to one particular embodiment, the method includes one or more of the following characteristic features, taken into consideration in isolation or in accordance with any technically possible combinations:

the indicators of significance calculated during the step e are either Shapley values, or Sobol' indices;

the first set comprises a total number of lists, the total number satisfying the following mathematical inequality:

$$Nt \leq Co * 2^{N1}$$

wherein Co is a predetermined coefficient;

the step b includes the generating of at least one portion of the lists of the first set in accordance with a probability law pertaining either to the second number or to the indicators contained in the list;

the step b includes the generation of all the lists in which the second number is less than or equal to a second predetermined integer that is strictly less than the first number;

the method includes, in addition, a further step a2 of providing a second score associated with a second vector that contains the second values of the parameters;

and wherein, during the step c, the third value is equal to the corresponding second value when the list comprises an indicator of the corresponding parameter;

The invention also provides an explanation method for explaining a score associated with a vector by means of a function, the function having a global maximum associated with a first extreme vector and a global minimum associated with a second extreme vector, the method including:

g1) the application, from the first score and from the global maximum, of the steps b to e of an explanation method as defined above for obtaining first indicators of significance, g2) the application, from the first score and from the global minimum, of the steps b to e of an explanation method as defined above for obtaining second indicators of significance, and h) generating, from the first and second indicators of significance, an explication for the first score.

A computer program product is also proposed including software instructions which, when they are executed by a computer, apply an explanation method as described above.

An information medium is also proposed on which is stored in memory a computer program product as described above.

A system for explaining a function associating a score with a vector of a first number of parameters is also proposed, each parameter being ordered with an indicator varying from one to the first number, the first number being an integer strictly greater than one, the system being capable of:

providing a first score associated with a first vector containing first values of the parameters, generating a first set of lists, each list comprising a second number of indicators, the second number being an integer strictly less than the first number and strictly greater than zero, generating, from a list, at least one third vector wherein each parameter has a third value, the third value being equal to the corresponding first value when the list does not include an indicator of the corresponding parameter, and different from the corresponding first value in the opposite case, calculating the score of at least one third vector, evaluating, from the scores calculated for each of the third vectors, an indicator of significance of each parameter, elaborating, from the evaluated indicators of significance, an explanation of the first score.

BRIEF DESCRIPTION OF DRAWINGS

The features and advantages of the invention will appear upon reading the description which follows, only given as a non-limiting example and made with reference to the appended drawings, wherein.

DETAILED DESCRIPTION OF PREFERRED EMBODIMENTS

Figure 1:
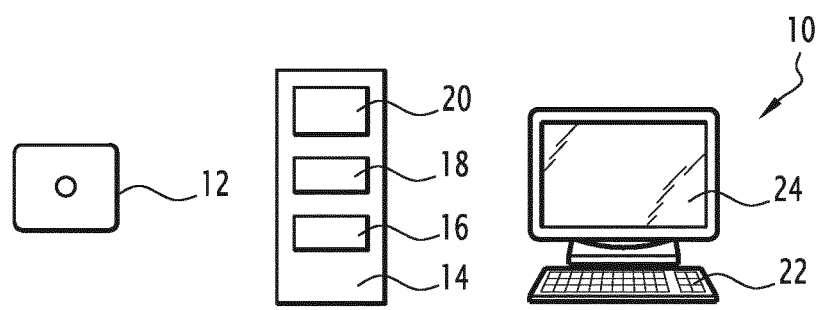
FIG. 1 is a schematic view of an exemplary system allowing the application of an explanation method.

A system 10 and a computer program product 12 are illustrated in FIG. 1.

The interaction of the computer program product 12 with the system 10 gives the possibility of applying a method.

The system 10 is a computer.

More generally, the system 10 is an electronic computer capable of handling and/or transforming data illustrated as electronic or physical amounts in registers of the system 10 and/or memories in other similar data corresponding to physical data in the memories, registers or other types of display, transmission or memory storage devices.

The system 10 includes a data processing unit 14 comprising a processor 16, memories 18 and a reader 20 of an information medium. The system 10 also comprises a keyboard 22 and a display unit 24.

The computer program product 12 includes a legible information medium 20.

An information legible medium 20 is a medium legible by the system 10, usually by the information processing unit 14. The legible information medium 20 is a medium suitable for storing in memory electronic instructions and capable of being coupled with a bus of a computer system.

As an example, the legible information medium 20 is an optical disc, a CD-ROM, a magneto-optical disc, a ROM memory, a RAM memory, an EPROM memory, an EEPROM memory, a magnetic card or an optical card.

On the legible information medium 20 the program comprising program instructions is stored in memory.

The computer program may be loaded on the data processing unit 14 and is adapted for causing the application of a method for explaining a score associated with a vector by a function when the computer program is applied on the processor 16.

Figure 2:
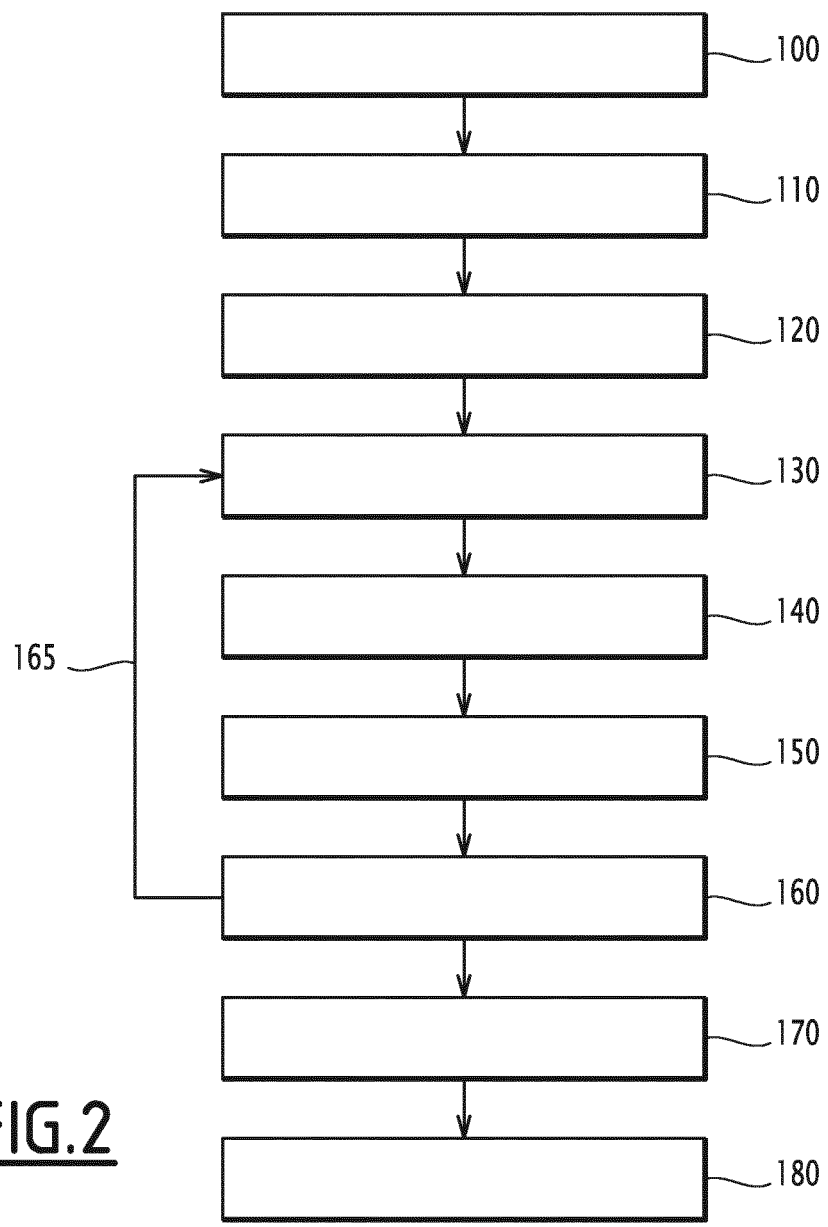
FIG. 2 is a flow chart of a first exemplary application of an explanation method.

The operation of the system 10 in interaction with the computer program product 12 is now described with reference to FIG. 2 which illustrates an exemplary application of a method for explaining a score associated with a vector by a function.

This method will be explained below by means of the simplified case, only given as an example, from the comparison between two automobiles.

The function is noted as U subsequently. The function U associates score with a vector.

The function U is for example a Choquet integral. The Choquet integral is an integral defined by the mathematician Gustave Choquet in 1953. The Choquet integral was initially used within the scope of statistical mechanics and of the potential theory before being applied to the decision theory in the 1980s. The Choquet integral gives the possibility of illustrating inter alia, strategies for making complex decisions such as bicycle criteria, preference criteria, synergies between criteria and redundancy between criteria.

Alternatively, the function U is a Generalized Additive Independence model. Introduced by Fishburn in 1970, the Generalized Additive Independence model builds a function U by adding utility functions U each bearing on a sub-set of parameters. The Generalized Additive Independence models give the possibility of modeling decisions where the parameters are not individually independent, but independences are observed between sub-sets of parameters (not necessarily disconnected). Thus a parameter may be used by several utility functions U when the parameter is present in several sub-sets. The significance of a parameter in the obtained score is therefore difficult to establish.

Alternatively, the function U is a weighted sum.

Each score is noted as Uv, wherein V is the name of the vector. Thus, for a first vector X, the first associated score is noted as Ux, and for a second vector Y, the second associated score is noted as Uy.

The score Ux, Uy is a single value associated with the vector X, Y by the function U.

The score Ux, Uy is preferably a real number.

Each vector X, Y is a set of values xi, yi, each value xi, yi being associated with a parameter.

Preferably, each parameter is distinct.

Each vector X, Y contains a first number $N_1$ of values xi, yi of the parameters.

Each value xi, yi is located by an index i representative of the position of the value xi, yi in each vector X, Y.

For example, each vector X, Y assumes the form of an N1-uplet of values xi, yi. Each vector X, Y comprises a single value xi, yi of each parameter.

Preferably, each vector X, Y assumes the form of an N1-uplet of values xi, yi, and the value xi, yi associated with a parameter Xi occupies the same position in each vector X, Y.

The first number N1 is an integer strictly greater than 1. For example, the first number N1 is greater than or equal to 3, preferably greater than or equal to 10, preferably greater than or equal to 15, preferably greater than or equal to 20, preferably greater than or equal to 50, preferably greater than or equal to 100.

Each parameter is a feature of an entity.

The parameters are noted as Xi, wherein i is the representative index of the position of the xi, yi value associated with the parameter Xi in each vector X, Y.

The index i is a parameter indicator Xi. This means that each index i is associated with a single parameter Xi, and vice versa.

The parameters Xi are therefore ordered by the index i.

The index i is an integer. The index i is on the one hand greater than or equal to 1, and on the other hand less than or equal to the first number N1.

As an example, the entity is a physical object, a concept, an action or else a list of actions or a list of physical objects.

For example, the entity includes five parameters which are in this order: a first parameter X1, a second parameter X2, a third parameter X3, a fourth parameter X4, and a fifth parameter X5.

For example, the entity is an automobile. In this case, the first parameter X1 is the price in Euros of the automobile, the second parameter X2 is the number of seated places in the automobile, the third parameter X3 is the number of doors of the automobile, the fourth parameter X4 is the fuel consumption in liters for a hundred kilometers covered, and the fifth parameter X5 is the horse power of the engine.

Each parameter $X_i$ may assume a plurality of values xi, yi comprised in a respective range Pi.

The range Pi is for example continuous. For example, each value x4, y4 of the fourth parameter X4 ("the consumption") is a real number strictly greater than 2 and strictly less than 15.

According to another example, the range Pi is a discrete range. For example, each value x2, y2 of the second parameter X2 ("number of places") is an integer greater than or equal to 1 and less than or equal to 8.

The explanation method comprises a provision step 100, a step 110 for generating a first set E1 of lists Lj, an initialization step 120, a step 130 for selecting a list Lj, a step 140 for generating a third vector, a computing step 150, an evaluation step 160, a step 170 for selecting a set of parameters Xi, and a step 180 for elaborating an explanation.

During the provision step 100, a first score Ux and a second score Uy are provided.

The first score Ux is associated with a first vector X by the function U. The first vector X contains the first number N1 of first values xi of the parameters Xi.

The second score Uy is associated with a second vector Y by the function U.

The first score Ux is for example strictly greater than the second score Uy.

The second vector Y contains the first number N1 of second values yi of the parameters Xi.

In the case when each entity is an automobile, the first vector X and the second vector Y represent two automobiles A and B to be compared.

The first vector X (10,000; 5; 3; 4.5; 75) represents the automobile A, and the second vector Y (12,000; 6; 5; 4.8; 80) represents the automobile B.

For example, the first vector X and the second vector Y are generated by an acquisition device external to the system 10, and transmitted by the acquisition device to the system 10 which calculates the first score Ux from the first vector X, and the second score Uy from the second vector Y.

In the example above, the first vector X is transmitted by a user to the system 10 via the keyboard 22.

The user first of all enters the first value x1, equal to 10,000 and representing the price of the automobile A.

Next, the user types in the first value x2, equal to 5 and representing the number of places in the automobile A.

Next, the user types in the first value x3 equal to 3 and representing the number of doors of the automobile A.

Next, the user transmits the first value x4 equal to 4.5 and representing the fuel consumption of the automobile A.

Finally, the user types in the first value x5 equal to 75 and representing the power of the engine of the automobile A.

Alternatively, the first score Ux and the second score Uy are provided by a device external to the system 10.

At the end of the generation step 110, a first set E1 of lists is generated.

Each list is noted as Lj, wherein j is an index locating the position of the list Lj in the first set E1.

This list Lj comprises at least one parameter indicator Xi.

Each indicator comprised in the list Lj is noted as ij. Indeed, each indicator ij is associated with a parameter Xi, and contained in a list Lj.

Each indicator is associated with a single parameter Xi and vice-versa.

Each list Lj is therefore able to define a sub-set SE2j of parameters Xi. This means that a parameter Xi is in the sub-set SE2j associated with this list Lj if and only if the list Lj contains the indicator ij associated with the parameter Xi.

Each list Lj comprises a second number N2j of indicators ij of the parameters Xi.

The second number N2j is an integer strictly greater than zero. The second number N2j is strictly less than the first number N1.

For example, the first set E1 contains a first list L1, a second list L2 and a third list L3.

The first list L1 contains the indicator 11 of the first parameter X1, the indicator 31 of the third parameter X3, and the indicator 51 of the fifth parameter X5.

The second list L2 contains the indicator 22 of the second parameter X2, and the indicator 42 of the fourth parameter X4.

The third list L3 contains the indicator 13 of the first parameter X1, and the indicator 23 of the second parameter X2.

For example, the list Lj is an N2j-uplet of indicators ij, each indicator ij of the list Lj being an integer equal to the index i of the corresponding parameter Xi.

According to this example, the first list L1 is (1, 3, 5), the second list L2 is (2, 4), and the third list L3 is (1, 2).

In a preferential example, each indicator ij is an integer equal to 1. The list Lj is an N1-uplet containing N2j indicators ij and elements ei,j. Each element ei,j is a number equal to zero.

The indicator ij associated with the parameter Xi is located in the i-th position in the list Lj.

According to this preferential example, the first list L1 is the 5-uplet (1; 0; 1; 0; 1), the second list L2 is the 5-uplet (0; 1; 0; 1; 0) and the third list L3 is the 5-uplet (1; 1; 0; 0; 0).

In another example, each indicator ij is the name of the corresponding parameter Xi.

The first set E1 comprises a plurality of first sub-sets SE1 each comprising a third number N3 of lists Lj. Each first sub-set SE1 groups together all the lists Lj including the same second number N2j of indicators ij.

The first set E1 contains a total number Nt of lists Lj.

The total number Nt of lists Lj is greater than or equal to the square of the first number N1.

For example, each generated list Lj contains at most two indicators ij.

The total number Nt of lists Lj is less than or equal to the product of a coefficient Co and of the maximum number Nm of possible lists Lj.

The maximum number Nm is equal to two to the power of the first number N1.

The inequality is therefore mathematically written as: $Nt \leq Co \ast 2^{N1}$

The coefficient Co is a predetermined real number.

The coefficient Co is for example strictly less than 1. Preferably the coefficient Co is equal to one-tenth.

At least one portion of the lists Lj of the first set E1 is generated according to a probability law P.

The probability law P for example deals with the indicators ij contained in each list Lj.

For example, the lists Lj are randomly generated according to a Latin hypercube algorithm. This means that the third number N3 of each first sub-set SE1 is equal to a first predetermined number Np, the first predetermined number Np being common to each first sub-set SE1, and the lists Lj of each first sub-set SE1 are randomly generated.

This means that the indicators ij of each list are generated according to a probability law P wherein each indicator ij has a probability equal to that of each other indicator ij being contained in the list Lj.

In the case when the first predetermined number Np is equal to three, the first set E1 comprises three lists Lj containing a single indicator ij, three lists containing two indicators ij, and so forth.

According to another example, the probability law P deals with the second number N2j of each list. This means that the probability law P is used by the system 10 for determining the number of lists Lj of each first sub-set SE1, and the lists Lj of each first sub-set SE1 are randomly generated.

Preferably, the third number N3 of each first sub-set SE1 is calculated, during step 110 for generating the first set E1, according to a Gauss law (also called "a normal law").

The Gaussian law is a probability law in which the probability density f(N3) is given by the equation:

$$f(N3) = \frac{e^{-\frac{1}{2}\left(\frac{N3-\mu}{\sigma}\right)^2}}{\sigma\sqrt{2\pi}}$$

wherein:

σ a is the standard deviation of the Gaussian law,

μ is the average of the Gaussian law,

π is the ratio of the perimeter of a circle to its diameter, and e refers to the exponential function.

Alternatively, the probability law P is a uniform or normal law dealing with the total number of lists Nt.

Alternatively, the coefficient Co is equal to 1. This means that all the possible lists Lj are generated.

At the end of the initialization step 120, an indicator of significance Ri of each parameter Xi is generated.

The significance indicator Ri is a quantity representative of the significance which the parameter Xi has in the calculation of the first score Ux and of the second score Uy.

Preferably, the significance indicator Ri is representative of the significance of the parameter Xi in the difference between the first score Ux and the second score Uy.

The significance indicator Ri is an element of a totally ordered space. This means that each significance indicator Ri is able to be compared with each significance indicator Ri.

The significance indicator Ri is preferably a real number.

The significance indicator Ri is for example a Shapley value.

The Shapley value is a quantity developed within the scope of the theory of games. Within a cooperative game wherein players have to form allies in order to manage a goal, the Shapley value is evaluated for each player from the number of winning coalitions comprising the player and becoming losers if the player withdraws from the coalition. The Shapley value therefore gives the possibility of evaluating the power of a player (i.e. his/her capability of influencing the final result), and is in particular used for determining the distribution of the gains in the case of a victory.

In our case, the Shapley value Ri is evaluated for each parameter Xi and gives the possibility of evaluating the significance of the parameter Xi in the difference between the first score Ux and the second score Uy.

Alternatively, the significance indicator Ri is a Sobol' indicator.

The Sobol' indicators are estimations of the sensitivity of a function of at least one parameter to a variation of this parameter. The sensitivity index of the first order of the function U to the parameter Xi is defined from the variance V(U) of the function U by the equation:

$$Ri(U) = \frac{V(E(U \mid Xi))}{V(U)}$$

wherein E(U|Xi) is the average of the function U when the parameter Xi is set.

The value of each significance indicator Ri is set equal to zero.

At the end of the selection step 130, a list Lj is selected.

For example, if no list Lj was selected during a previous selection step 130, the list L1 of index j equal to one is selected.

The index j of the list Lj is for example stored in memory in the memory 18.

In the example given above of the comparison between two automobiles, the list L1 (1; 0; 1; 0; 1) is selected.

At the end of the generation step 140, a third vector Cj and at least one fourth vector Di,j are generated.

The third vector Cj comprises third values ci,j of the parameters Xi.

The third vector Cj is generated from the list Lj selected and at least from the first vector X.

Each third value ci,j is equal to the corresponding first value xi when the list Lj does not comprise a corresponding parameter Xi indicator ij.

In the opposite case, the third value ci,j is different from the first value xi.

Preferably, when the list Lj comprises an indicator ij of the parameter Xi, the corresponding third value ci,j is equal to the corresponding second value yi.

In the given case of the comparison between two automobiles, the third vector C1 (12000; 5; 5; 4.5; 80) is generated from the list L1 (1; 0; 1; 0; 1) of the first vector X (10000; 5; 3; 4.5; 75), and of the second vector Y (12000; 6; 5; 4.8; 80).

Figure 3:
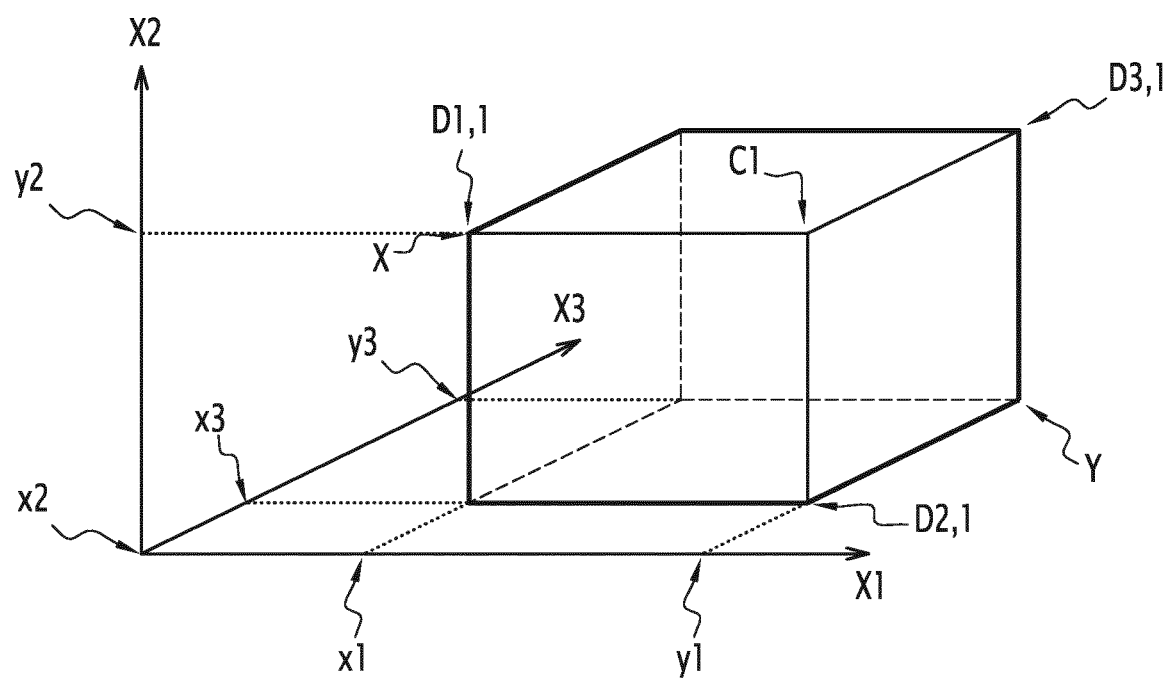
FIG. 3 is a graphic illustration of vectors used and/or generated by the explanation method of FIG. 2.

The first vector X, the second vector Y and the third vector C1 are represented graphically in three dimensions in FIG. 3. Only the first parameter X1, the second parameter X2, and the third parameter X3 have been represented, for reasons of clarity.

Upon the conclusion of the step 140 of generation, a fourth vector is also generated for each parameter Xi, from the third vector Cj.

The fourth vector is denoted by Di,j, and marked for identification by the index j of the third vector Cj and by the index i of the parameter Xi.

Every fourth vector Di,j comprises fourth values of the parameters Xi.

Every fourth value of the fourth vector Di,j is denoted by di,j,m, where m is an integer index identifying the position of the fourth value di,j,m in the fourth vector Di,j. The index m of the fourth value di,j,m is greater than or equal to one, and less than or equal to the first number N1.

Every fourth value di,j,m is equal to the corresponding third value ci,j if the index m of the fourth value di,j,m is different from the index i of the parameter Xi.

In the contrary case, the fourth value di,j,m is different from the third value ci,j. Preferably, the fourth value di,j,m is equal to the first value xi if the third value ci,j is equal to the second value yi, and is equal to the second value yi if the third value ci,j is equal to the first value xi.

In other words, the fourth vector Di,j associated with the parameter Xi having index i is constructed, from the third vector Cj, by replacing the third value ci,j of index i, and only the latter, by, depending on the case, the first value xi or the corresponding second value yi in a manner such that the fourth vector Di,j is different from the third vector Cj.

In the case given as an example of the comparison between two automobiles, five fourth vectors Di,1 are generated from the third vector C1 (12000; 5; 5; 4.5; 80).

The fourth vector D1,1 (10000; 5; 5; 4.5; 80) is generated for the first parameter X1. Only the fourth index value m, which is equal to one, is different from the corresponding third value C1,1.

The fourth vector D2,1 (12000; 6; 5; 4.5; 80) is generated for the second parameter X2. Only the fourth index value m, which is equal to two, is different from the corresponding third value c3,2.

The fourth vector D3,1 (12000; 5; 3; 4.5; 80) is generated for the third parameter X3. Only the fourth index value m, which is equal to three, is different from the corresponding third value c3,1.

The fourth vector D4,1 (12000; 5; 5; 4.8; 80) is generated for the fourth parameter X4. Only the fourth index value m, which is equal to four, is different from the corresponding third value c4,1.

The fourth vector D5,1 (12000; 5; 5; 4.5; 75) is generated for the fifth parameter X5. Only the fourth index value m, which is equal to five, is different from the corresponding third value c5,1.

Upon the conclusion of the step 150 of calculation, a third score Ucj is calculated from the third vector Cj, and a fourth score Udi,j is calculated from each fourth vector Di,j For example, the third score Ucj and fourth scores Udi,j are calculated by the information processing unit 14.

According to another example, the third vector Cj and the fourth vectors Di,j are transmitted to an external computing device that the information processing unit 14 is capable of controlling. The computing device sends back in return to the system 10 the third score Ucj and the fourth scores Udi,j.

Upon the conclusion of the step 160 of evaluation, the indicator of significance Ri of each parameter Xi is evaluated.

Preferably the indicator of significance Ri is evaluated from the third score Ucj and from the fourth scores Udi,j.

For this purpose, the absolute value of the difference between the third score Ucj and the fourth score Udi,j associated with the parameter Xi is calculated. The value of the indicator of significance Ri is thus then increased by a quantity Q that is equal to the calculated absolute value, divided by the total number Nt of lists Lj of the first set E1.

This is mathematically written as follows:

$$Ri = Ri + \frac{|Ucj - Udi,j|}{Nt}$$

The evaluated indicator of significance Ri is thus an approximation of a Shapley value.

By way of a variant, during this step 160 of evaluation, only the parameters Xi for which the first value xi is different from the second value yi are considered. This signifies that, when the first value xi and the second value yi are equal, the indicator of significance Ri of the corresponding parameter Xi is not evaluated during this step 160 of evaluation.

If all of the lists Lj have not yet been selected, the step 130 of selection is reiterated. The reiteration is represented in FIG. 2 by an arrow 165.

The step 130 of selection of a list Lj, the step 140 of generation of a third vector Cj, the step 150 of calculation of at least one score, and the step 160 of evaluation of at least one indicator of significance Ri are then reiterated in the order presented here above for another list Lj.

For example, the index j that is saved and stored is increased by one, and the step 130 of selection of a list Lj, the step 140 of generation of a third vector Cj, the step 150 of calculation of at least one score and the step 160 of evaluation of at least one indicator of significance Ri are carried out for the corresponding list Lj.

When the step 130 of selection of a list Lj, the step 140 of generation of a third vector Cj, the step 150 of calculation of at least one score and the step 160 of evaluation of at least one indicator of significance Ri have been carried out for each of the lists Lj, the step 160 of evaluation is followed by a step 170 of selection of at least one parameter Xi.

For example, when the index j of the list Lj is equal to the total number Nt of lists Lj, the step 160 of evaluation is followed by the step 170 of selection of at least one parameter Xi.

In the case given as an example, after each step 160 of evaluation had been carried out, a first indicator of significance R1, a second indicator of significance R2, a third indicator of significance R3, a fourth indicator of significance R4 and a fifth indicator of significance R5 were evaluated.

The first indicator of significance R1 is associated with the first parameter X1, the second indicator of significance R2 is associated with the second parameter X2, and so on.

The first indicator of significance R1 is equal to 0.5, the second indicator of significance R2 is equal to 0.05, the third indicator of significance R3 is equal to 0.10, the fourth indicator of significance R4 is equal to 0.30, and the fifth indicator of significance R5 is equal to 0.05.

This means that the parameter Xi that has the greatest significance in the difference between the first score Ux and the second score Uy is the first parameter X1. The parameters Xi that have the least significance in the difference between the first score Ux and the second score Uy are the second parameter X2 and the fifth parameter X5.

Upon the conclusion of the step 170 of selection of at least one parameter Xi, a fourth set E4 of parameters Xi is selected.

The fourth set E4 comprises of a fourth number N4 of parameters Xi. The fourth number N4 is, for example, predetermined.

By way of a variant, the fourth number N4 is determined during the step 170 of selection of at least one parameter Xi, from the evaluated indicators of significance Ri.

The parameter Xi selected during the step 170 of selection of at least one parameter Xi are the parameters Xi whose indicators of significance Ri are the highest.

In the example presented here above, the fourth number N4 is equal to two, and the first parameter X1 associated with the first indicator of significance R1 equal to 0.5 and the fourth parameter X4 associated with the fourth indicator of significance R4 equal to 0.30 are selected.

Upon the conclusion of the step 180 of elaboration, an explanation Ex is elaborated.

The explanation Ex is capable of explaining to a decision maker the first score Ux.

The explanation Ex is, for example, an explanation relative to the first score Ux as compared to the second score Uy.

This means that the explanation Ex is capable of explaining to a decision maker the difference between the first score Ux and the second score Uy. In particular, the explanation Ex is capable of explaining to a decision maker the reasons why a score Ux, Uy is superior to another score Ux, Uy.

The explanation Ex is elaborated based on the selected parameters Xi. For example, the explanation Ex includes a list of the selected parameters Xi.

The explanation Ex includes, for example, an explanatory "fill in the blanks" phrase or sentence such as, "[1] is preferred to [2] on account of: _" where [1] is the name of the entity associated with the highest score. The explanatory "fill in the blanks" phrase or sentence is followed by the list of selected parameters Xi.

In the case given as an example of the comparison between two automobiles A and B, the explanation Ex is thus: "A is preferred to B on account of its price, its fuel consumption."

The explanation is displayed on the display unit 24.

The explanation method for explaining the score Ux does not assume that the function U is known. The explanation method can therefore be used in conjunction with an external device for calculating a score whose operational details are not known. Only the first and second scores Ux,Uy and the associated first and second vectors x, y are known.

Moreover, the explanation method is adaptable since it is not related to a particular function. No assumption pertaining to the function U is used.

In a second embodiment, the step 160 of evaluation is followed by the step 170 of selection of at least one parameter Xi if all of the lists Lj have not yet been selected and, during the step 160 of evaluation the quantity Q is strictly less than a predetermined threshold value S.

This is mathematically written as follows:

$$\left| Ri - \left( Ri + \frac{|Ucj - Udi, j|}{Nt} \right) \right| < S$$

The explanation method does not take into account certain non significant lists Lj (for which the quantity Q is less than the threshold value S). The explanation method can therefore be carried out more rapidly.

Figure 4:
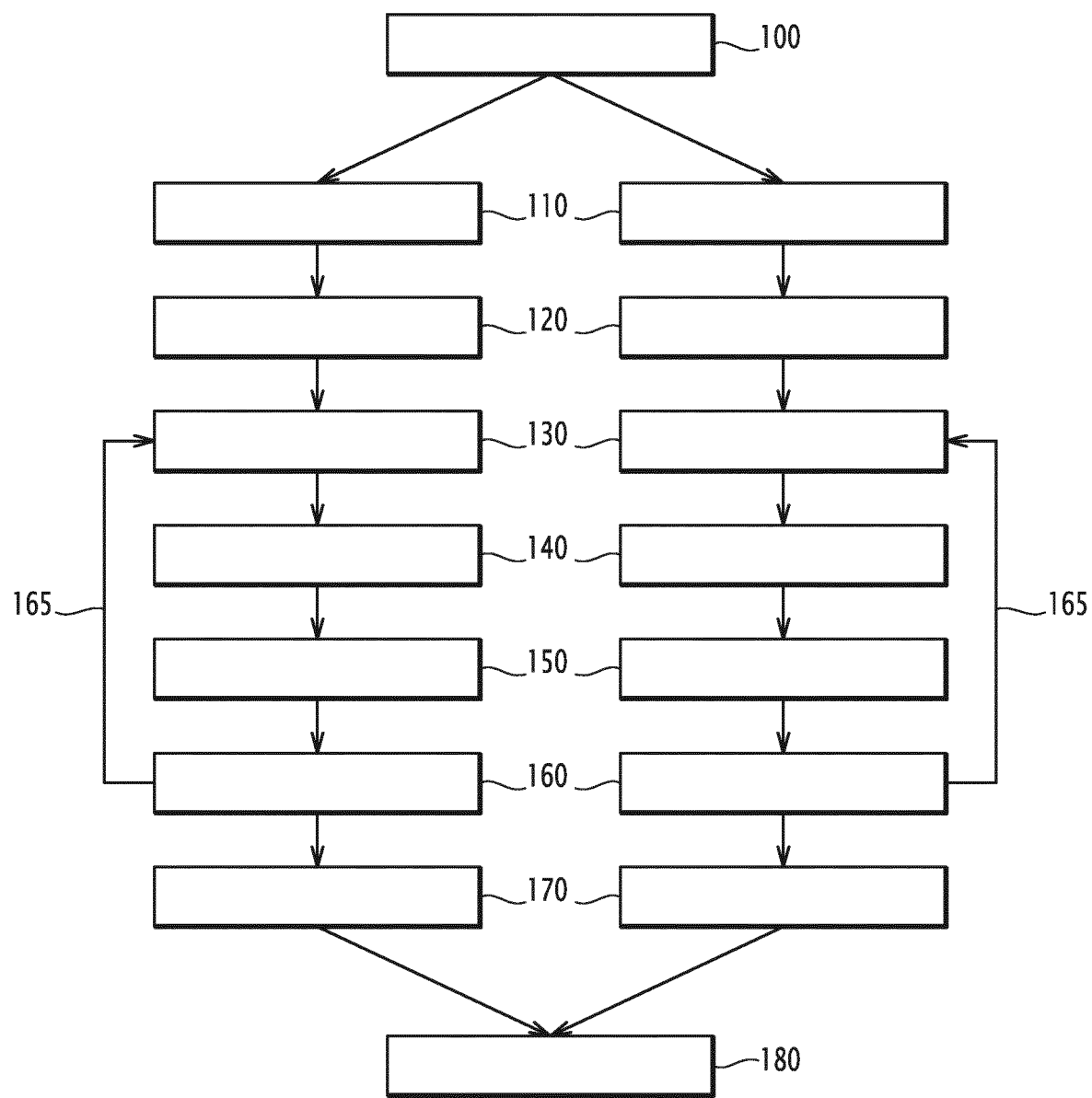
FIG. 4 is a flow chart of another exemplary application of an explanation method.

A flowchart of a third exemplary implementation of a method of explanation is represented in FIG. 4.

The elements that are identical to the first example shown in FIG. 2 are not described again. Only the differences have been highlighted.

The function U has a global maximum Ug associated with a first extreme vector G, and a global minimum Ub associated with a second extreme vector B.

The global maximum Ug and the global minimum Ub of the function U are saved and stored in the memory storage 18.

For example, the global maximum Ug and the global minimum Ub of the function U were obtained by means of a mathematical analysis of the function U.

By way of a variant, the global maximum Ug and the global minimum Ub of the function U are obtained by means of an experimental method. For example, all of the possible vectors X,Y are generated and the score Ux, Uy associated with each of the vectors X,Y is calculated.

The operation of the third example will now be described.

Only the first score Ux is provided upon the conclusion of the step 100 of provision of a first score. No second score Uy is provided.

The step 110 of generation of a first set E1, the step 120 of initialization, the step 130 of selection of a list Lj, the step 140 of generation of a third vector Cj, the step 150 of calculation of at least one score, the step 160 of evaluation of at least one indicator of significance Ri, and the step 170 of selection of a set of parameters Xi are thus carried out based on the first vector x and the first extreme vector G.

This means that, over the course of the step 110 of generation of a first set E1, of the step 120 of initialization, of the step 130 of selection of a list Lj, of the step 140 of generation of a third vector Cj, of the step 150 of calculation of at least one score, of the step 160 of evaluation of at least one indicator of significance Ri, and the step 170 of selection of one set of parameters Xi, the global maximum Ug is used in place of the second score Uy, and the first extreme vector G is used in place of the second vector Y.

Upon the conclusion of the step 160 of evaluation, a first indicator of significance Rpi is obtained for each parameter Xi.

Upon the conclusion of the step 170 of selection of at least one parameter Xi, a fifth set E5 of parameters Xi is selected on the basis of the first indicators of significance Rpi evaluated.

Subsequently, the step 110 of generation of a first set E1, the step 120 of initialization, the step 130 of selection of a list Lj, the step 140 of generation of a third vector Cj, the step 150 of calculation of at least one score, the step 160 of evaluation of at least one indicator of significance Ri, and the step 170 of selection of a set of parameters Xi are carried out based on the first vector x and the second extreme vector B.

This means that, over the course of the step 110 of generation of a first set E1, the step 120 of initialization, of the step 130 of selection of a list Lj, of the step 140 of generation of a third vector Cj, of the step 150 of calculation of at least one score, of the step 160 of evaluation of at least one indicator of significance Ri, and of the step 170 of selection of a set of parameters Xi, the global minimum Ub is used in place of the second score Uy, and the second extreme vector B is used in place of the second vector Y.

Upon the conclusion of the step 160 of evaluation, a second indicator of significance Rdi is obtained for each parameter Xi.

Upon the conclusion of the step 170 of selection of at least one parameter Xi, a sixth set E6 of parameters Xi is selected on the basis of the second indicator of significance Rdi evaluated.

Upon the conclusion of the step 180 of elaboration, the explanation Ex is elaborated based on the fifth set E5 and on the sixth set E6.

The explanation method then provides the ability to explain the first score Ux in an absolute manner. This signifies that the method is capable of explaining the first score Ux without comparing it to a second score Uy.

Figure 5:
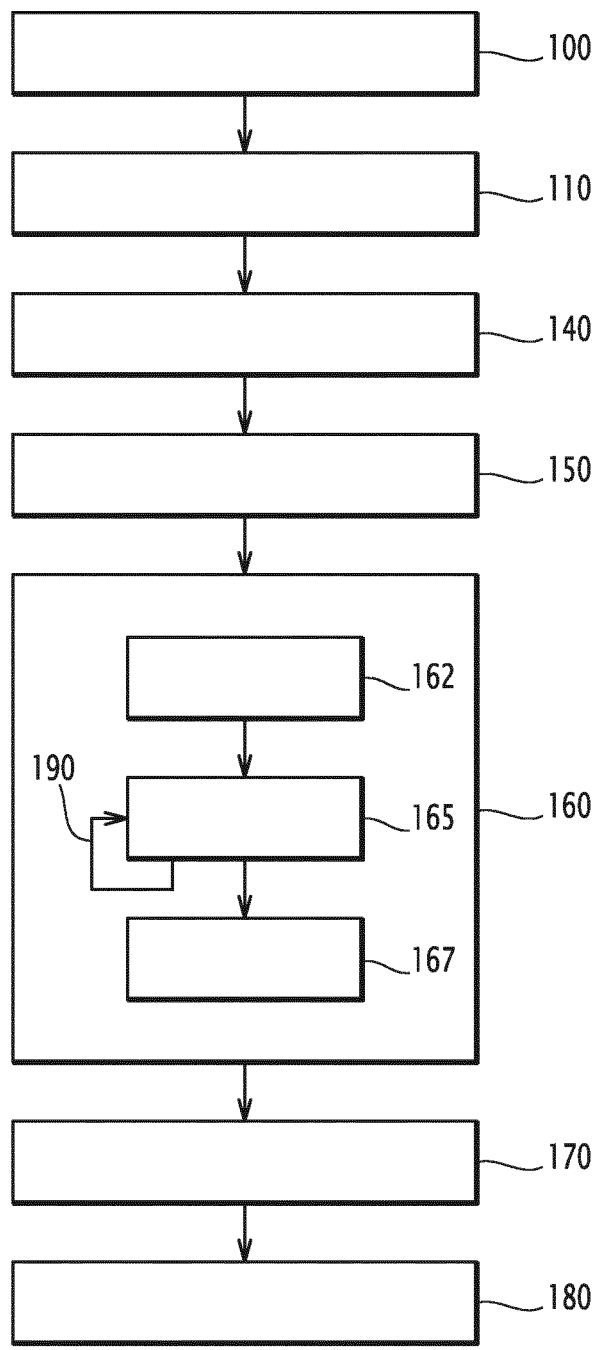
FIG. 5 is a flow chart of another exemplary application of an explanation method.

A flowchart of a fourth exemplary implementation of a method of explanation is shown in FIG. 5.

The elements that are identical to the first example shown in FIG. 2 are not described again. Only the differences have been highlighted.

The Möbius coefficients are the elements obtained, based on a first sequence, by means of the Möbius inversion formula. The Möbius inversion formula was introduced into Number theory in the nineteenth century by August Ferdinand Möbius.

According to the Möbius inversion formula, a Möbius coefficient m(Lj) is defined for each list Lj, by the equation:

$$m(Lj) = \sum_{T \subseteq Lj} (-1)^{|Lj \setminus T|} v(T)$$

wherein:
T is a secondary list containing the indicators ij and included in the list Lj,
|Lj\T| is the number of indicators ij contained in the list Lj and not being contained in the secondary list T, and
v(t) is the difference between a third score Ut associated with a third vector Cj and the first score Ux, the third vector Cj being calculated based on the secondary list T.

The function U is k-additive.

This means that there exists a second predetermined number k for which the Möbius coefficient m(Lj) of each list Lj is equal to zero if the second number N2$j$ of the list Lj is strictly greater than the second predetermined number k.

The second predetermined number k is an integer that is strictly greater than 1 and strictly less than the first number N1.

For example, the second predetermined number k is equal to 3. Preferably, the second predetermined number k is equal to 2.

Upon the conclusion of the step 110 of generation of the first set E1, all the lists Lj in which the second number N2$j$ is less than or equal to a second predetermined number k are generated.

No list in which the second number N2$j$ is strictly greater than the second predetermined number k is generated.

Only the first sub-sets SE1 associated with a second number N2$j$ that is less than or equal to the second predetermined number k are thus generated.

Also defined for each parameter Xi, is a third subset SE3$i$ of lists Lj. The third subset SE3$i$ each includes the lists Lj that contain the indicator ij of the parameter Xi. Every third subset SE3$i$ is included in the first set E1.

The step 120 of initialization and the step 130 of selection are not carried out.

Upon the conclusion of the step 140 of generation of a third vector Cj, the third vector associated with each list Lj is generated.

No fourth vector Di,j is generated.

Only the third score Ucj of each third vector Cj is calculated upon the conclusion of the step 150 of calculation.

The step 160 of evaluation includes a sub-step 162 of initialization, followed by a sub-step 165 of calculation of at least one Möbius coefficient, and then a sub-step 167 of evaluation of at least one significance indicator Ri.

The coefficient m(Lj) is a real number that is equal to the difference between the third score Ucj associated with the third vector Cj generated from the list Lj and the first score Ux. This is mathematically written as follows:

$$m(Lj) = Ucj - Ux$$

An iterator n is also generated. The iterator n is fixed equal to zero.

Upon the conclusion of the sub-step of calculation 165, the iterator n is increased by one. This is mathematically written as follows:

$$n := n+1$$

A reduced list Lrj is generated, for each list Lj, if the list Lj contains an indicator ij of the parameter Xn having index equal to the iterator n;

The reduced list Lrj is constructed, from the list Lj, by the deletion of the indicator ij associated with the parameter Xn having index equal to the iterator n. This means that the reduced list Lrj contains each of the indicators ij contained in the list Lj, with the exception of the indicator ij that is equal to the iterator n.

For example, upon the conclusion of the first sub-step 165 of calculation, the reduced list Lr1 (0; 0; 1; 0; 1) is generated from the list L1 (1; 0; 1; 0; 1).

The coefficient m(Lj) of each list is fixed to be equal to the difference between the coefficient m(Lj) associated with the list Lj, and the coefficient m(Lr, j) associated with the reduced list Lrj. This is mathematically written as follows:

$$m(Lj) := m(Lj) - m(Lrj)$$

If the list Lj does not contain an indicator ij that is equal to the iterator n, the coefficient m(Lj) is not changed.

If the iterator n is strictly less than the first number N1, the first sub-step of calculation 165 is reiterated. The reiteration is represented in FIG. 5 by an arrow 190.

Otherwise, the first sub-step of calculation 165 is followed by a second sub-step of calculation 167.

Upon the conclusion of the second sub-step of calculation 167, the indicator of significance Ri associated with each parameter Xi is evaluated.

Each indicator of significance Ri is equal to the sum, for each list Lj containing the indicator ij of the parameter Xi, the ratio between the coefficient m(Lj) having index associated with the list Lj and the second number N2$j$ in the list Lj.

This can be mathematically written as follows:

$$Ri = \sum_{Lj \in SE3i} \frac{m_k(Lj)}{N2j}$$

When the second sub-step of calculation 167 is completed, the step 170 of selection of at least one parameter Xi is carried out.

When the function U is k-additive, the indicator of significance Ri associated with each parameter is thus then a Shapley value and not an approximation of a Shapley value.

The explanation method for explaining a score Ux is therefore more precise. The explanation Ex generated is thus more relevant.

The explanation method is adaptable since it is not related to a particular function. The explanation method only assumes to know that the function U is k-additive.

In a fifth example of an explanation method, upon the conclusion of the step 170 of selection of at least one parameter Xi, at least two fourth sub-sets SE4m of parameters are selected.

The elements that are identical to the first example shown in FIG. 2 are not described again. Only the differences have been highlighted.

Upon the conclusion of the step 170 of selection, a fifth number N5 of fourth sub-sets SE4 are generated based on the indicators of significance Ri received.

In the following sections of the description, each fourth sub-set SE4 will be marked for identification by an index m and denoted by SE4m.

Every fourth sub-set SE4m contains at least one parameter Xi.

Preferably, the fourth sub-sets SE4m are generated in accordance with a data partitioning method.

The partitioning of data (or data clustering as per the accepted terminology) is one of the statistical methods for analysis of data. The data partitioning is aimed at dividing a data set into various different homogeneous sub-sets, in the sense that the data in each sub-set share common characteristics, which correspond most often to the criteria of proximity between or among objects.

In the case of the fourth sub-sets SE4m, the proximity criterion used is the difference between the indicators of significance Ri.

The parameters Xi are classified in the fourth sub-sets SE4m according to ascending order of the indicators of significance Ri calculated. This means that each of the parameters Xi of the fourth sub-set SE41 having index m equal to 1 is associated with an indicator of significance Ri that is greater than each of the indicators of significance Ri associated with the parameters Xi of the fourth subset SE42 having index m equal to 2, and so on.

Upon the conclusion of the step 180 of elaboration, the explanation Ex is elaborated based on the fourth sub-sets SE4m of parameters Xi generated.

For example, the explanation Ex takes the form of an explanatory "fill in the blanks" phrase or sentence of the following type: "The automobile A is preferred to the automobile B first of all on account of the parameters [1], followed by the parameters [2], and finally on account of the parameters [3]", where [1] is a list of parameters Xi of the fourth sub-set SE41, [2] is a list of parameters Xi of the fourth sub-set SE42, and [3] is a list of parameters Xi of the fourth sub-set SE43.

The explanation method automatically adjusts the number of parameters Xi used in the explanation Ex to the indicators of significance Ri evaluated. The elaborated explanation Ex is therefore more pertinent.

Each of the examples provided here above of the explanation method is able to be carried out with a function U which is not precisely known.

The explanation method does not depend on the function U that is used. The explanation method is therefore adaptable to a large number of functions U.

In addition, the explanation Ex is elaborated based on the Shapley values associated with each parameter Xi. The explanation Ex is therefore more pertinent.

Finally, during the implementation of the explanation method, only a reduced number of lists Lj is generated. The explanation method therefore presents good performance elements, especially in terms of time of computation.

The invention claimed is:

1. A score explanation method for explaining a score presented to a user and associated with a vector of a first number of parameters, the first number being an integer that is strictly greater than one, the method comprising the steps of:
   a1) providing a first score associated with a first vector where the parameters of the first vector contain first values, each parameter being ordered with a first indicator that varies from one to the first number, each first indicator being associated with a single parameter and vice versa;
   a2) providing a second score associated with a second vector that contains second values of the parameters;
   b) generating a first set of lists, each list comprising a second number of indicators, the second number being an integer that is strictly less than the first number and strictly greater than zero;
   c) generating, from a list of the first set of lists, a third vector comprising parameters having third values, each parameter being ordered with an indicator that varies from one to the first number,
   where the third values each are equal to the first value of the parameter associated with the indicator when the list does not include an indicator associated with the parameter, and the third values each being equal to the second value of the parameter associated with the indicator when the list comprises an indicator associated with the parameter;
   d) calculating a score of the third vector;
   e) evaluating, from the score calculated for the third vector, indicators of significance for each of the parameters, each indicator of significance being a quantity representative of a significance of the parameter in the calculation of the first score;
   f) elaborating, from the evaluated indicators of significance, an explanation of the first score associated with the first vector, and presenting to the user the explanation as an output to the user.

2. The method according to claim 1, wherein the indicators of significance calculated during the step e) are one of Shapley values and Sobol' indices.

3. The method according to claim 1, wherein the first set comprises a total number of lists, the total number satisfying the following mathematical inequality:

$$Nt \leq Co * 2^{N1}$$

wherein $N_t$ is the total number of the lists,
wherein $N_1$ is the first number, and
wherein Co is a predetermined coefficient.

4. The method according to claim 1, wherein the step b) includes the generating of at least one portion of the lists of the first set in accordance with a probability law pertaining either to the second number or to the indicators contained in the list.

5. The method according to claim 1, wherein, in the step b) all lists having a second number less than or equal to a second predetermined integer that is strictly less than the first number are generated.

6. An explanation method for explaining a score presented to a user and associated by means of a function applied to a vector, the function having a global maximum associated with a first extreme vector that is a vector having a highest score, and a global minimum associated with a second extreme vector that is a vector having a lowest score, the method comprising:

g1) obtaining first indicators of significance from the global maximum by applying the sub-steps of providing a first score associated with a first vector where the parameters of the first vector contain first values, each parameter being ordered with a first indicator that varies from one to the first number, each first indicator being associated with a single parameter and vice versa, providing a second score associated with the first extreme vector that contains second values, called first extreme values, of the parameters, generating a first set of lists, each list comprising a second number of indicators, the second number being an integer that is strictly less than the first number and strictly greater than zero, generating, from a list of the first set of lists, a third vector comprising parameters having third values, each parameter being ordered with an indicator that varies from one to the first number, where the third values each are equal to the first value of the parameter associated with the indicator when the list does not include an indicator associated with the parameter, and the third values each are equal to the second value of said parameter associated with the indicator when the list does include an indicator associated with the parameter, calculating a score of the third vector, and evaluating, from the score calculated for the third vector, first indicators of significance for each of the parameters, each first indicator of significance being a quantity representative of a significance of the parameter in the calculation of the first score;

g2) obtaining second indicators of significance from the first score and from the global minimum by applying the sub-steps of providing the first score associated with a first vector where the parameters of the first vector contain first values, each parameter being ordered with a first indicator that varies from one to the first number, each first indicator being associated with a single parameter and vice versa, providing a second score associated with the second extreme vector that contains second values, called second extreme values, of the parameters, generating a first set of lists, each list comprising a second number of indicators, the second number being an integer that is strictly less than the first number and strictly greater than zero, generating, from a list of the first set of lists, a third vector comprising parameters having third values, each parameter being ordered with an indicator that varies from one to the first number, where the third values each are equal to the first value of the parameter associated with the indicator when the list does not include an indicator associated with the parameter, and the third values each are different from the first value of said parameter associated with the indicator when the list does include an indicator associated with the parameter, calculating a score of the third vector, evaluating, from the score calculated for the third vector, second indicators of significance for each of the parameters, each second indicator of significance being a quantity representative of a significance of the parameter in the calculation of the first score;

h) generating, from the first and second indicators, an explanation of the first score, and presenting to the user the explanation as an output to the user.

7. A non-transitory computer-readable medium on which is stored a program product comprising software instructions which, upon execution by a computer, carry out a method according to claim 1.

8. An explanation system for explaining a score presented to a user and associated with a vector of a first number of parameters, the first number being an integer that is strictly greater than one, the system being configured to:

receive a first score associated with a first vector where the parameters of the first vector contain first values, each parameter being ordered with a first indicator that varies from one to the first number, each first indicator being associated with a single parameter and vice versa;

receive a second score associated with a second vector where parameters of the second vector contain second values;

generate a first set of lists, each list comprising a second number of indicators, the second number being an integer strictly less than the first number and strictly greater than zero;

generate, from a list of the first set of lists, at least one third vector comprising parameters having third values, each parameter being ordered with an indicator that varies from one to the first number, where the third values each are equal to the first value of the parameter associated with the indicator when the list does not include an indicator associated with the parameter, and the third value each being equal to the second value of the parameter associated with the indicator when the list comprises an indicator associated with the parameter;

calculate a score of the third vector;

evaluate, based on the score calculated for the third vector, indicators of significance for each of the parameters, each indicator of significance being a quantity representative of a significance of the parameter in the calculation of the first score;

elaborate, from the evaluated indicators of significance, an explanation of the first score associated with the first vector; and presenting to the user the explanation as an output to the user.

9. The method according to claim 2, wherein the first set comprises a total number of lists, the total number satisfying the following mathematical inequality:

$$Nt \leq Co * 2^{N1}$$

wherein $N_t$ is the total number of lists,
wherein $N_1$ is the first number, and
wherein Co is a predetermined coefficient.

10. The method according to claim 2, wherein the step b) includes the generating of at least one portion of the lists of the first set in accordance with a probability law pertaining either to the second number or to the indicators contained in the list.

11. The method according to claim 3, wherein the step b) includes the generating of at least one portion of lists of the first set in accordance with a probability law pertaining either to the second number or to the indicators contained in the list.

12. The method according to claim 2, wherein, in the step b) all lists having a second number less than or equal to a second predetermined integer that is strictly less than the first number are generated.

13. The method according to claim 3, wherein, in the step b) all lists having a second number less than or equal to a second predetermined integer that is strictly less than the first number are generated.

14. A non-transitory computer-readable medium on which is stored software instructions which, upon execution by a computer, carry out a method according to claim 3.

15. A non-transitory computer-readable medium on which is stored software instructions which, upon execution by a computer, carry out a method according to claim 2.

16. The method according to claim 6, wherein the function is an unknown function, provided by an external device.

* * * * *